United States Statutory Invention Registration [19]

[11] Reg. Number: H599

Smith et al.

[43] Published: Mar. 7, 1989

[54] APPARATUS AND METHOD FOR SIMULATING MATERIAL DAMAGE FROM A FUSION REACTOR

[75] Inventors: Dale L. Smith, Naperville; Lawrence R. Greenwood, River Forest; Benny A. Loomis, Naperville, all of Ill.

[73] Assignee: The United States of America as represented by the United States Department of Energy, Washington, D.C.

[21] Appl. No.: 196,537

[22] Filed: May 20, 1988

[51] Int. Cl.[4] ..... G21B 1/00

[52] U.S. Cl. ..... 376/100; 376/146; 376/159; 376/150

*Primary Examiner*—Harvey E. Behrend

*Attorney, Agent, or Firm*—Robert J. Fisher; Paul A. Gottlieb; Judson R. Hightower

[57] ABSTRACT

An apparatus and method for simulating a fusion environment on a first wall or blanket structure. A material test specimen is contained in a capsule made of a material having a low hydrogen solubility and permeability. The capsule is partially filled with a lithium solution, such that the test specimen is encapsulated by the lithium. The capsule is irradiated by a fast fission neutron source.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Simultaneous $^{6}$Li Enrichment and T Preinjection

APPARATUS AND METHOD FOR SIMULATING MATERIAL DAMAGE FROM A FUSION REACTOR

CONTRACTUAL ORIGIN OF THE INVENTION

The U.S. Government has rights in this invention under Contract No. W-31-109-ENG-38 between the U.S. Deparment of Energy and the University of Chicago representing Argonne National Laboratory.

BACKGROUND OF THE INVENTION

The present invention relates generally to an apparatus and method for simulating the effects of a fusion environment on materials and more particularly to an apparatus and method of simulating a fusion environment on first wall and blanket materials using a fast fission reactor.

The quest to tap the energy of nuclear fusion by magnetically confining an ultra hot plasma has been in progress for more than three decades. Many technological problems remain to be resolved before a fusion rector will be economically viable. One of the most important factors involves the choice of materials for first wall and blanket structures.

The first wall materials will be exposed to high neutron fluxes at energies up to 14 MeV and a potentially corrosive chemical environment. Additionally, many reactor designs call for pulsed operation which leads to cyclic stresses, temperatures and neutron fluxes. The unique radiation exposure of first wall and blanket structures generated by an operating fusion reactor creates the need for a well developed data base on the effects of such radiation on materials properties. Irradiation damages studies must be performed to determine the effects on physical and mechanical properties of the materials.

Since no prototypic fusion reactors are presently available, other techniques must be used to simulate the irradiation effects that are expected to be produced by the intense high-energy neutron flux generated in an operating fusion reactor. The simulation must generate damage on materials similar to that expected from an operating fusion reactor.

Several irradiation effects techniques for simulating fusion reactor conditions and radiation damage mechanics are discussed by R. L. Klueh et al. in ORNL-5830 (1981) which is incorporated herein by reference.

One technique is the irradiation of materials with neutrons from a fission reactor. The primary difference between the fusion reactor irradiation environment and that in the core of a fission reactor is the high-energy component of the neutron spectrum (up to 14.1 MeV) resulting from the fusion reaction compared to the average creation energy of neutrons in a fast reactor (about 2 MeV). The high energy of the fusion neutrons creates somewhat higher displacement damage per neutron interaction with a lattice atom. Displacement implies displacement of an atom from its normal lattice position. The displacement is caused by the collision of a neutron with a lattice atom. The extent of displacement damage is expressed in terms of how often an atom is displaced from its normal lattice position as displacements per atom or dpa.

In addition to the displacement damage, the neutrons in both fission and fusion reactors will also give rise to transmutation reactions which produce solid products as well as helium and hydrogen within the structural materials.

At the projected operating temperature of commercial fusion reactor structures (250°–700° C.) the transmuted hydrogen will have a high mobility in most materials and may readily diffuse out of the materials. However, small amounts of transmuted helium produced within the lattice can have pronounced effects on the material properties, since helium has low mobility and is essentially insoluble in metals and alloys. As a result, the helium atom affects void nucleation and swelling. Also, at elevated temperatures the collection of helium on grain boundaries leads to loss of ductility or helium embrittlement.

The neutron energy spectrum corresponding to a fusion reactor will generate much larger concentrations (approximately 100 times larger) of transmutation helium than is produced by a fast fission reactor. Because the evaluation of microstructures during irradiation depends largely on the interaction of the helium with the displacement damage, it is important that irradiation damage studies properly simulate the helium production rates that correspond to an operating fusion reactor.

Another technique used in irradiation studies is the use of accelerator based high-energy neutron sources. Because of the small irradiation volume, only a small number of specimens can be irradiated. Further, the low fluences of irradiations in current accelerator-based high-energy neutron sources preclude the formation of significant amounts of helium and displacement damage.

Another available technique for alloys that contain nickel is the use of mixed-spectrum reactors, that is, reactors which have both thermal and fast neutron spectra. Due to the interaction of nickel with the thermal neutrons, helium will be generated in concentrations similar to those produced in a fusion reactor first wall. The fast neutron flux will also cause displacement damage similar to a fusion environment. This method, however, is limited to alloys that contain nickel. Problems exist in achieving simultaneous production of helium and displacement damage at ratios similar to those produced in a fusion reactor.

Other techniques which have been proposed in order to obtain the desired helium and dpa levels are the use of stainless steel uniformly doped with $^{10}B$ and the preinjection of specimens with helium prior to neutron irradiation.

Another available technique for obtaining helium in alloys with a high hydrogen solubility involves dissolving tritium in the alloy to be tested. The tritium decays to $^{3}He$ with a half-life of 12 years. It has been proposed that this technique could be used to study the effect of the simultaneous helium and displacement damage production during fission-reactor irradiation of selected materials. This technique would be especially useful for niobium, vanadium and titanium alloys which have high solubility for hydrogen. The experimental procedures involve the handling of tritium which must be contained.

Andersen et al., J. Nucl. Mater. 85 and 86 (1979) 435 have proposed the use of a pressurized capsule containing $^{3}He$. Test specimens are disposed in the pressurized capsule and irradiated in a mixed-spectrum reactor. Displacement damage is obtained from the fast neutrons while the thermal neutrons produce tritium and protium. The hydrogenic species is introduced into the specimens by solution or ion implantation. The difficulty associated with this technqiue is that the ions must be implanted by energetic methods. To date this technique has not been used.

Some of the promising materials for fission reactor first wall and blanket structures are vanadium-based alloys. Vanadium based alloys exhibit several properties which are favorable for such applications. Vanadium and some selected vanadium-based alloys qualify as low activation materials. This low-activation material property is particularly important with respect to waste management. The alloys exhibit good high temperature strength and relatively low thermal stresses because of low thermal expansion and high thermal conductivity properties. The limited data available indicate that vanadium-based alloys are also highly resistant to radiation induced swelling.

Dominant concerns regarding the use of vanadium-based alloys for fusion reactor applications relate to the following properties of the alloy: its nonmetallic element interactions, fabricability issues, and sensitivity to radiation embrittlement. For vanadium and vanadium-based alloys there are no heretofor available methods for irradiation studies which simultaneously produce displacement damage and transmutation in these materials.

Therefore, in view of the above, it is an object of the present invention to provide an environment which simulates the conditions on a first wall and blanket structure of an operating fusion reactor.

It is a further object of the present invention to provide an apparatus and method which will simultaneously generate a dpa and helium production rate similar to that of an operating fusion reactor in vanadium-based alloys and other materials having a high hydrogen solubility.

It is still another object of the present invention to provide an environment which simulates a fusion environment using presently available neutron sources.

Additional objectives, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objectives and in accordance with the purposes of the present invention, as embodied and broadly described herein, the apparatus and method of the present invention may comprise a capsule made of a material having a low hydrogen solubility and permeability partially filled with a lithium solution. A test specimen is placed in the lithium solution and the capsule is irradiated by a fast fission neutron source. The invention—which is particularly useful for vanadium-based alloys—simulates the simultaneous displacement damage and transmutation effects of the alloy exposed to a fusion neutron spectrum. Tritium is generated in lithium by neutron reactions. At elevated temperatures, the tritium is highly mobile and diffuses rapidly from the lithium into the specimen thereby attaining predictable near equilibrium conditions. The tritium in the test specimen will thereafter decay to helium at predictable rates.

DETAILED DESCRIPTION OF THE INVENTION

Figure 1:
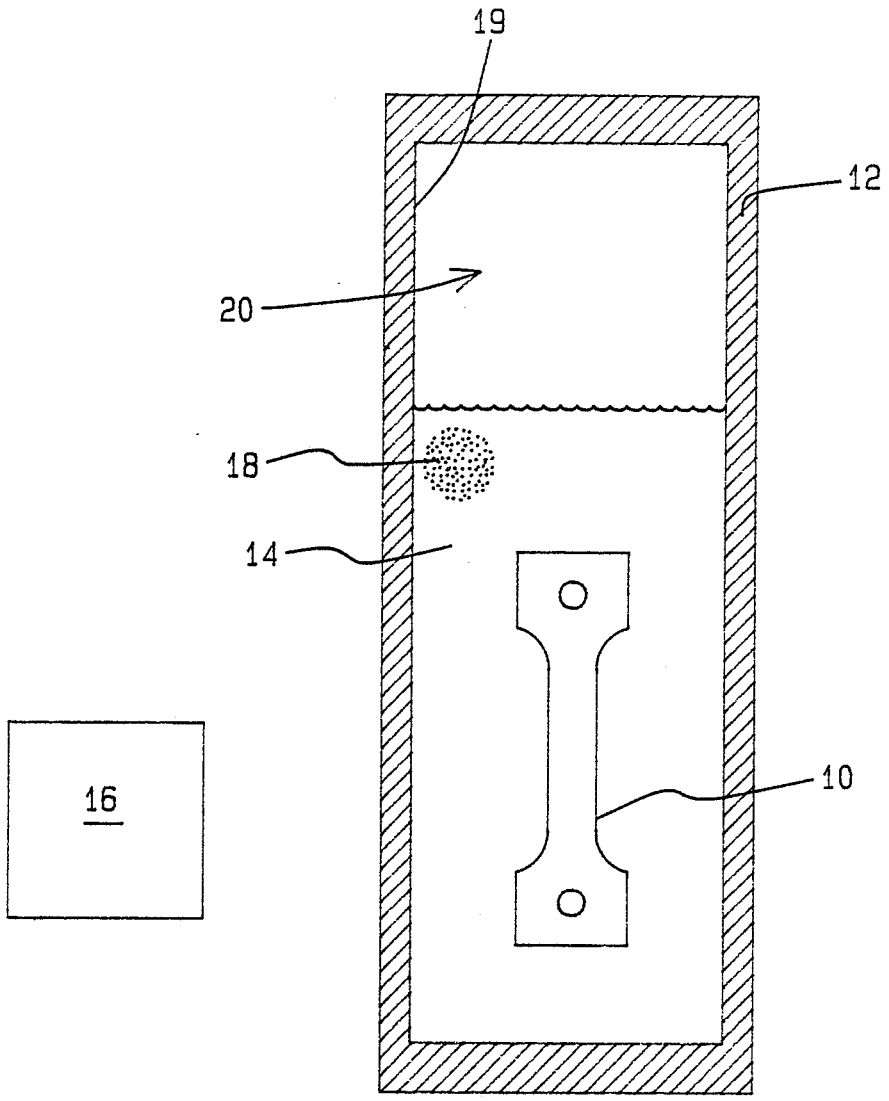
FIG. 1 is a schematic diagram of the apparatus of the present invention.

Reference will now be made in detail to the preferred embodiments of the invention, an example of which is illustrated in the accompanying drawings. Referring specifically to FIG. 1, a vanadium-based alloy specimen 10 is contained in capsule 12. Lithium, contained in a solution 14, partially fills capsule 12. The entire capsule 12 is then irradiated by a fast fission source 16, such as by inserting the capsule 12 into the core of the Fast Fission Test Facility (FFTF).

In an exemplary embodiment of the present invention, the capsule 12 is of the duplex type, which has a lining 19, preferably made of vanadium. The liner 19 will prevent stray materials or impurities from entering the system.

Helium is generated uniformily in the vanadium-based alloy by the following mechanisms. Tritium is generated in the lithium 14 by the following reaction:

$$n + {}^6Li \rightarrow He + T$$

At elevated temperatures the tritium is highly mobile and diffuses rapidly from lithium into the vanadium alloy attaining predictable near equilibrium conditions. The tritium in the alloy will then decay to helium ($^3$He) in the alloy at a rate of 5.5% per year (determined by the half-life of tritium).

Preferably the lithium is enriched with $^6$Li. Enrichment will allow the helium generation rate in the vanadium specimen 10 to be varied over a large range by adjusting the enrichment.

Irradiation from a fast fission neutron source 16, such as the FFTF, provides a neutron displacement damage rate of 30–60 dpa/year in vanadium-based alloys. This compares to a predicted displacement rate of 45 dpa/-year in a characteristic fusion reactor first wall with a nominal 5 MW/m$^2$ neutron wall load.

The tritium generation rates in the lithium 14 can be accurately calculated by currently available neutronic and dosimetry methods, such as those disclosed by R. G. Clemmer et al., Argonne National Laboratory Report, ANL-IN-8455 (1984). The total tritium generation rate from the $^6$Li(n,d)T reaction can be varied by over two orders of magnitude by adjusting the $^6$Li enrichment from 1 to 90%. This will provide for a similar variation in the helium generation rate in vanadium. Minor predictable variations will occur because of neutron spectrum changes associated with neutron source location (i.e., reactor core location). Preferably small amounts of tritium are preinjected in the lithium 14 which can be used to adjust the tritium source in the initial stages. Since the preinjected tritium (represented in FIG. 1 by shaded area 18) can be retained in the lithium 14 until the temperature is raised at the time of insertion into the reactor, helium generation in the vanadium specimen 10 can be delayed almost until displacement damage is initiated.

Tritium is highly mobile at temperatures of interest (>300° C.) and will redistribute into the vanadium in very short times (<<1 hour). Therefore, nearly equilibrium conditions will exist at temperatures above 300° C. The equilibrium distribution coefficients for hydrogen in the vanadium-lithium system have been calculated as a function of temperature from temperature dependent Sieverts' constants ($K_s$) for the vanadium hydrogen and lithium-hydrogen systems, as disclosed by K. Natesan et al., Nucl. Technol. 22 (1974).

D. L. Smith et al., Proc. Second International Conference on Liquid Metals in Energy Production, describes preliminary experiments to determine the equilibrium distribution of hydrogen between lithium and V-15Cr-5Ti. The measured distribution coefficient is relatively insensitive to temperature and results in a value considerably larger than the calculated value for pure vanadium.

Even though discrepencies exist between the calculated and measured equilibrium distribution and additional measurements are necessary to resolve these discrepencies, both results indicate that near equlibrium conditions will exist at the pertinent temperatures.

A tritium concentration in vanadium of the order of 400 weigh parts per million (wppm) will provide the desired helium generation rate that corresponds to a He/dpa ratio of 5, at a damage rate of 50 dpa/year. This concentration of hydrogen (tritium) in vanadium is not expected to produce significant effects on mechanical properties of the alloys at the temperatures of interest.

It is necessary to consider the neutron burnup of $^3$He in the vanadium to obtain an accurate measure of the helium generation rate. For a neutron spectrum produced by a reactor such as the FFTF, the $^3$He burnup rate is higher than the tritium decay rate. Therefore, the concentration of tritium in the alloy must exceed the desired concentration of helium.

Other factors that affect the tritium mass balance in the system must be considered to obtain desirable helium generation rates in the vanadium alloy. These include tritium permeation through the wall of the capsule 12 and tritium inventory in the capsule wall. In order to minimize these effects the capsule 12 is preferably constructed of a material with low hydrogen (tritium) permeability and solubility. Molybdenum alloy TZM has been used as a capsule material. Tungsten exhibits lower permeability characteristics and would be preferred in this respect. However, this material is difficult to weld.

The magnitude of the leakage $Q_L$ can be evaluated as follows if the leakage is controlled by diffusion of tritium through the wall of the capsule 12.

$$Q_L = \frac{DSN_c}{d\,V_L}$$

where D is the diffusivity, S is the surface area, $N_c$ is the tritium concentration immediately below the inner surface of the capsule 12, d is the wall thickness, and $V_L$ is the volume of lithium 14. The equlibrium distribution coefficient $K_A{}^c$ for tritium in the wall material/lithium system is given by $$K_A{}^c = \frac{N_c}{N_L}$$

where $N_c$ and $N_L$ are the concentrations of tritium in the capsule material and lithium, respectively. These two equations can be combined to provide an expression for the leakage rate as a function of the tritium concentration in lithium. For a capsule 10 of representative size (10 mm-diameter×20 mm-long×1 mm-wall), the leakage coefficients for molybdenum and tungsten capsules are $3.7\times10^{-9}$ s$^{-1}$, and $4.0\times10^{-12}$ respectively. The value for a capsule 10 made of molybdenum in this case is comparable to the tritium decay constant of $1.8\times10^{-9}$s$^{-1}$. Therefore, leakage from the molybdenum capsule 10 must be considered when determining the helium production rate in the test alloy specimen 10. However, leakage from a capsule 10 made of tungsten (or equivalent) is insignificant.

Figure 2:
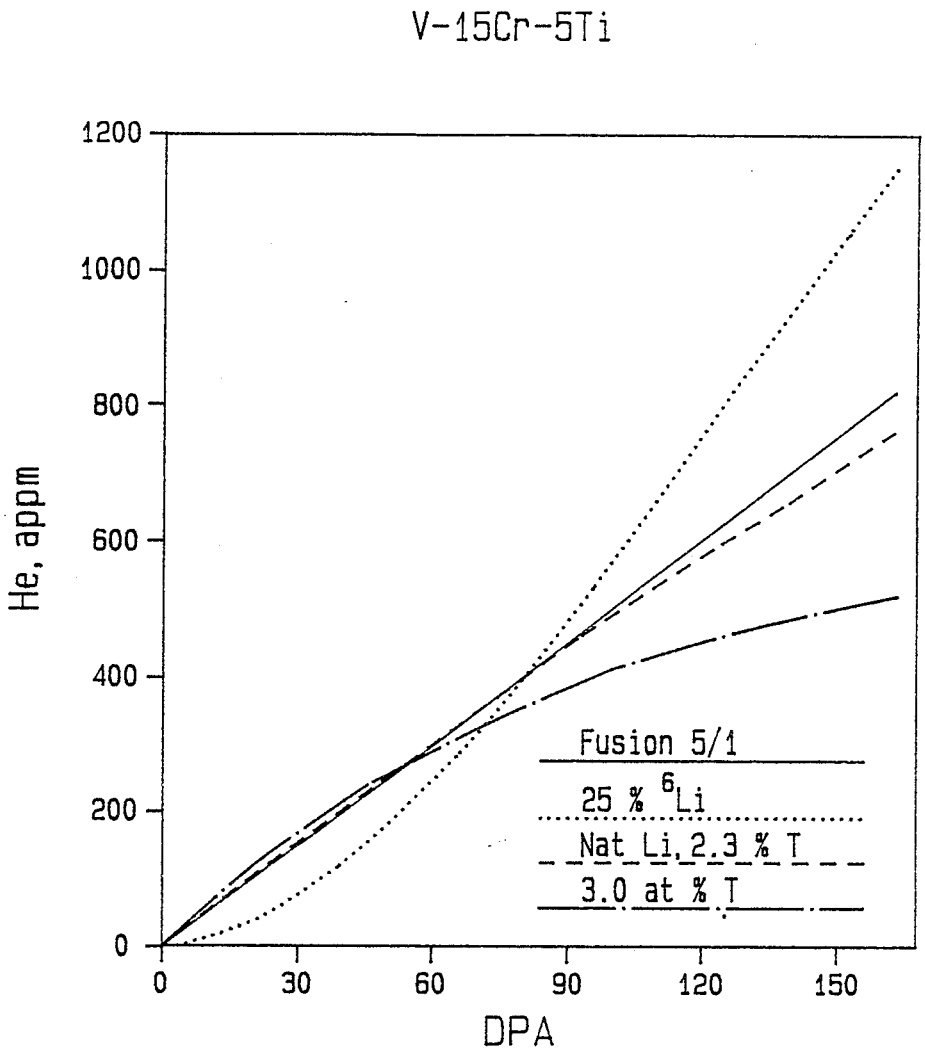
FIG. 2 is a graph which shows the predicted helium and displacement damage ratios for a fusion reactor first wall with curves representing the damage ratios using the apparatus and method of the present invention.
Figure 3:
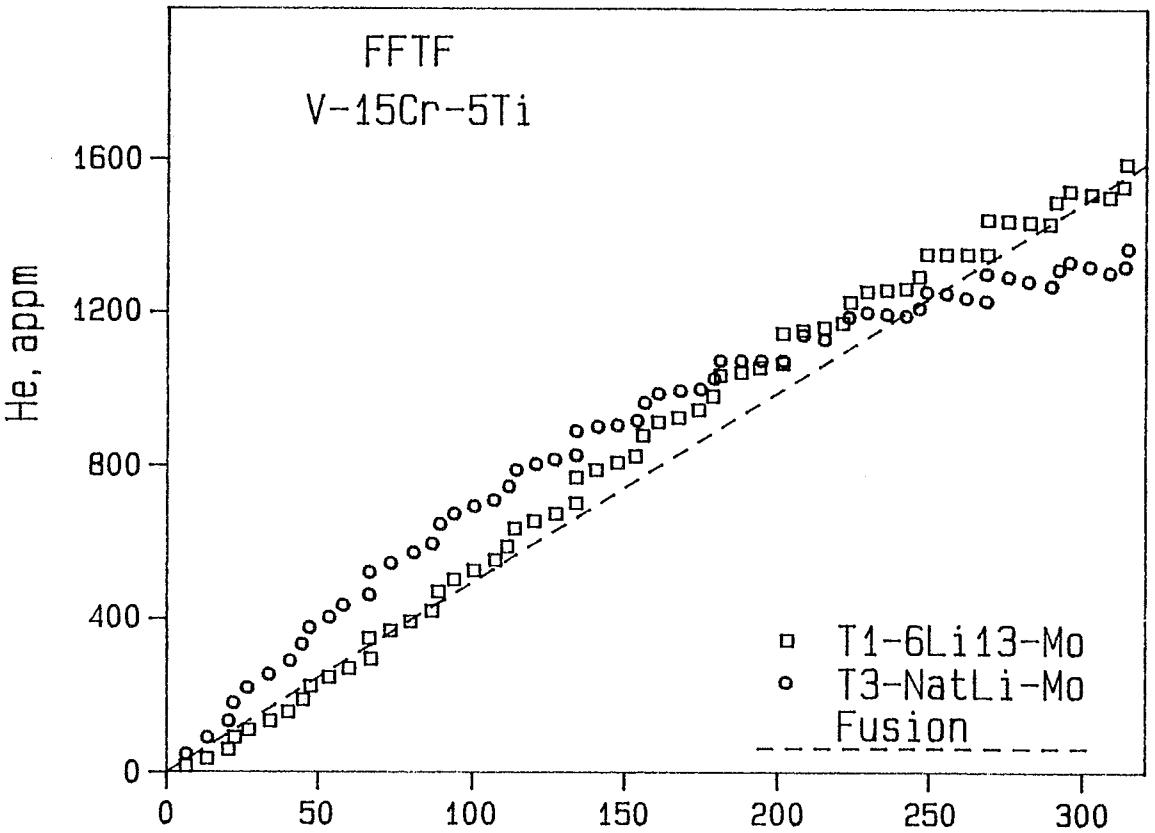
FIG. 3 shows calculated values for helium and displacement damage for the case where helium is generated from preinjecting tritium and from tritium produced from enriched $^6$Li according to the present invention for experiments conducted in a fast fission reactor spectrum.

The time dependence of the helium generation rate in the vanadium alloy specimen 10 can be controlled over a wide range by adjusting the $^6$Li enrichment and the precharged tritium concentration in lithium. FIGS. 2 and 3 show a comparison of the predicted helium-to-displacement damage rate for a V-15Cr-5Ti alloy exposed to a fusion neutron environment (atomic parts per million (appm) *He/dpa*=5) with calculated values for several experimental conditions.

In FIG. 2, the dotted curve represents case #1 where all the tritium is generated during irradiation from 25% enriched $^6$Li. The initial helium generation rate is below the desired level, and the final helium generation rate is above the desired level for the fusion simulation. The hyphenated curve represents case #2 where tritium is provided solely by precharging the lithium. Initial rates are close to the desired level; however, the helium generation rates at high damage levels (>60 dpa) are below the desired level. The dashed curve represents case #3 where the initial helium generation is provided primarily by precharging the lithium with tritium. The helium generation rate is maintained near the desired level by tritium produced from natural lithium.

FIG. 3 indicates calculated values obtained for two cases where helium is generated both from preinjected tritium and from tritium produced from enriched $^6$Li. The case with 1 at. % tritium and 13% $^6$Li (open squares) illustrates that nearly constant He/dpa ratios appear attainable with appropriate selection of two primary variables; viz., preinjected tritium concentration and $^6$Li enrichment. The other case shows that nearly desired helium levels can be obtained with natural lithium if larger amounts (2–3%) of tritium are preinjected.

Referring again to FIG. 1, a significant amount of tritium will also be generated within the lithium 14 in the capsule 12. This helium will collect in the plenum region 20 at the top of the capsule 12. The plenum 20 must be sized so as to accommodate the pressure buildup from the helium which is more important at high fluences. As an example, at 450° C. the tritium concentration in lithium based on calculated distribution coefficients is about 50 times the concentrations in vanadium (for alloys with titanium this value is expected to be less). For a He/dpa ratio of 5, the amount of helium generated at 100 dpa is 500 appm in vanadium and 25,000 appm in lithium (assuming equal volumes). This corresponds to 90 cm$^3$ (STP) of helium generated per gram of lithium. The pressure buildup in a 1 $cm^3$ plenum corresponds to about 100 MPa. Several more detailed aspects must be considered, which tend to ameliorate this problem. Since the calculated distribution coefficient decreases as the temperature increases, the pressure will be less at higher temperatures. The distribution coefficients for the alloys are expected to be less than for vanadium and the ratio of lithium to vanadium can be reduced within limits.

Although the preferred embodiments of the present invention have been described with reference to a vanadium alloy test specimen, it will be readily apparent to those skilled in the art that the techniques described above may be used with specimens made of other materials, e.g., Ta and Nb, which have a high hydrogen solubility. Here a high hydrogen solubility is defined as a solubility greater than 100 wppm.

Thus, the present invention provides a unique apparatus and method for providing displacement damage and a helium generation rate which is similar to that for fusion reactor conditions. Test specimens are encapsulated with lithium for irradiation by a fast fission neutron source. The lithium provides for uniform temperature control and neutron displacement damage. Tritium is generated in lithium by neutron reactions and/or by preinjection of tritium into the lithium. At the temperature of interest, the tritium is highly mobile and diffuses rapidly from the lithium into the test specimens thereby attaining predictable near-equilibrium conditions. The helium generation rate can be conveniently varied by plus or minus an order of magnitude from the calculated target rate by varying the $^6Li$ enrichment and/or the precharged tritium concentration.

The foregoing descriptions of the preferred embodiments of the invention have been presented for purposes of illustration and description. They are not intended to be exhaustive or to limit the invention to the precise form disclosed, and obviously many modification and variations are possible in light of the above teachings. The embodiments were choosen and described in order to better explain the principle of the invention and its practical applications to thereby enable others skilled in the art to best utilize the invention and various embodiments and with other modifications as are suited to the particular use contemplated. It is intended that the scope of the invention be defined by the claims appended hereto.

The embodiments of this invention in which an exclusive property or privilege is claimed are defined as follows:

1. An apparatus for simulating the effects a fusion environment on materials comprising:

a capsule made of a material having a low hydrogen permeability and solubility capable of being subjected to a fast fission neutron source;

a lithium solution partially filling said capsule; and a test specimen made of a material having a high hydrogen solubility and contained in said capsule.

2. The apparatus of claim 1 wherein said test specimen is made of a vanadium alloy.

3. The apparatus of claim 2 wherein said capsule is made of a material selected from the group consisting of molybdenum and tungsten.

4. The apparatus of claim 3 further comprising tritium preinjected into said lithium solution.

5. The apparatus of claim 4 wherein said lithium solution is enriched with $^6Li$.

6. The apparatus of claim 5 further comprising a vanadium lining disposed on the inner surface of said capsule.

7. A method for simulating the effects of a fusion environment on materials, said method comprising the steps of:

encapsulating a test specimen in a container made of a material having a low hydrogen solubility and permeability;

partially filling said container with a lithium solution; and irradiating said container with fast fission neutrons.

8. The method of claim 7 wherein said encapsulated test specimen is a vanadium alloy.

9. The method of claim 8 wherein said test specimen is encapsulated with a container made of a material selected from the group consisting of tungsten and molybdenum.

10. The method of claim 9 further comprising the step of preinjecting tritium in said lithium solution.

11. The method of claim 10 further comprising the step of enriching said lithium with $^6Li$.

12. The method of claim 11 further comprising the step of lining the inner surface of said container with vanadium.

* * * * *